(12) United States Patent
Pizzagalli

(10) Patent No.: US 8,517,446 B2
(45) Date of Patent: Aug. 27, 2013

(54) VEHICLE PROVIDED WITH SPARE WHEEL

(75) Inventor: Veniero Pizzagalli, Serramazzoni (IT)

(73) Assignee: Ferrari S.p.A., Modena (IT)

( * ) Notice: Subject to any disclaimer, the term of this patent is extended or adjusted under 35 U.S.C. 154(b) by 47 days.

(21) Appl. No.: 13/097,803

(22) Filed: Apr. 29, 2011

(65) Prior Publication Data

US 2011/0266823 A1 Nov. 3, 2011

(30) Foreign Application Priority Data

Apr. 30, 2010 (IT) ................................ BO2010A0268

(51) Int. Cl.
| | |
|---|---|
| *B62D 43/00* | (2006.01) |
| *B62D 43/06* | (2006.01) |
| *B62D 43/04* | (2006.01) |
| *B60P 3/22* | (2006.01) |

(52) U.S. Cl.
USPC ..................... 296/37.2; 296/37.14; 296/37.3

(58) Field of Classification Search
USPC .......... 296/37.2, 37.3, 37.14, 187.11, 187.03, 296/187.05, 187.08, 193.07, 203.04, 203.02
See application file for complete search history.

(56) References Cited

U.S. PATENT DOCUMENTS

| | | | | |
|---|---|---|---|---|
| 1,813,094 | A | * | 7/1931 | Appel ............................ 414/463 |
| 1,913,835 | A | * | 6/1933 | Golike ........................... 414/466 |
| 2,214,937 | A | * | 9/1940 | Ragsdale ...................... 296/37.2 |
| 2,320,856 | A | * | 6/1943 | Ehlers ............................ 414/466 |
| 3,642,296 | A | * | 2/1972 | Froumajou .................... 280/834 |
| 4,805,817 | A | * | 2/1989 | Helterbrand ............... 224/42.23 |
| 5,419,609 | A | * | 5/1995 | Kmiec et al. ............. 296/187.11 |
| 6,231,097 | B1 | | 5/2001 | Schell et al. |
| 6,279,793 | B1 | * | 8/2001 | Treis .......................... 224/42.23 |
| 7,410,081 | B2 | * | 8/2008 | McClure et al. ............. 224/403 |
| 2002/0185881 | A1 | | 12/2002 | Kosuge et al. |
| 2006/0119125 | A1 | * | 6/2006 | Muthigi et al. .............. 296/37.2 |
| 2007/0096488 | A1 | | 5/2007 | Suzuki et al. |
| 2009/0195032 | A1 | | 8/2009 | Yamaguchi et al. |
| 2009/0267365 | A1 | * | 10/2009 | Puppini et al. ................ 293/118 |

FOREIGN PATENT DOCUMENTS

| | | |
|---|---|---|
| DE | 2827855 | 9/1979 |
| DE | 4323621 C1 * | 9/1994 |

OTHER PUBLICATIONS

Search Report for Italian Application No. BO20100268, Ministero dello Sviluppo Economico, Munich, Nov. 8, 2010, pp. 2.

* cited by examiner

*Primary Examiner* — Glenn Dayoan
*Assistant Examiner* — Sunsurraye Westbrook
(74) *Attorney, Agent, or Firm* — Bryan A. Santarelli; Graybeal Jackson LLP

(57) ABSTRACT

An embodiment of a vehicle having: a boot compartment; a spare wheel, which is housed within the boot compartment; and a thrust device, which is set within the boot compartment, rests against the spare wheel, and pushes the spare wheel in an eccentric way in order to bring about a rotation of the spare wheel about a horizontal axis of rotation and towards a vertical position following upon a progressive reduction of the size of the boot compartment during impact.

4 Claims, 8 Drawing Sheets

VEHICLE PROVIDED WITH SPARE WHEEL

PRIORITY CLAIM

The instant application claims priority to Italian Patent Application No. BO2010A000268, filed Apr. 30, 2010, which application is incorporated herein by reference in its entirety.

TECHNICAL FIELD

An embodiment relates to a vehicle provided with spare wheel.

BACKGROUND

In a modern vehicle it is normally necessary to envisage the possibility of housing a spare wheel, which may be supplied as standard component or else as an optional component (in some markets the presence of the spare wheel is an indispensable requisite for enabling registration of the vehicle, whereas in other markets the presence of the spare wheel depends upon the will of the purchaser).

For automobile manufacturers, the presence of the spare wheel represents a constraint that requires consideration right from the design stage in so far as the spare wheel is an object of large dimensions (as compared to the dimensions of the compartments available for housing it) and high stiffness and typically must hence be appropriately positioned in order not to alter the response of the vehicle in the event of impact and hence not to alter the level of safety provided for the occupants of the vehicle.

For example, an automobile with a rear engine has a front boot compartment designed for housing the spare wheel. In order not to alter the response of the vehicle in the event of (front) impact, the spare wheel would have to be oriented in the front boot compartment in a vertical or quasi vertical position in order to minimize the longitudinal encumbrance and hence not to hinder controlled deformation of the front part of the vehicle during a front impact. In fact, if the spare wheel were set in the front boot compartment in a horizontal or quasi horizontal position, during a front impact the spare wheel itself would constitute a rigid body set longitudinally that opposes controlled deformation of the front part of the vehicle and hence that adversely affects the response of the automobile in the event of front impact. In other words, in the event of front impact the spare wheel set in the front boot compartment in a horizontal or quasi horizontal position tends to remain in the pre-impact position, getting jammed between the various elements of the car frame and hence reducing controlled deformation of the struts and thus increasing the level of deceleration experienced by the vehicle and by its occupants.

However, in a high-performance automobile with rear engine, the spaces available in the front boot compartment for housing the spare wheel are very limited since it is typically necessary to guarantee high aerodynamic performance (i.e., to maximize the penetration coefficient, at the same time reducing the area of the front section). In a high-performance automobile with rear engine, in order to maximize the aerodynamic performance, it would probably be necessary to set the spare wheel in the front boot compartment in the quasi horizontal position in so far as said quasi horizontal positioning enables a considerable reduction of the area of the front section (in addition to enabling also a certain reduction of the weight of the vehicle) as a result of a reduction of the transverse and vertical encumbrance.

U.S. patent application No. US2002185881A1, which is incorporated by reference, describes a vehicle comprising: a rear boot compartment; a spare wheel, which is housed within the rear boot compartment; and a thrust device, which is set within the rear boot compartment, comprises an inclined plane resting on which is a portion of the spare wheel, and pushes the spare wheel in an eccentric way in order to bring about a rotation of the spare wheel about a horizontal axis of rotation and towards a vertical position following upon a progressive reduction in the dimensions of the rear boot compartment during impact.

SUMMARY

An embodiment includes a vehicle equipped with spare wheel, said vehicle being free from the drawbacks described above and being at the same time easy and inexpensive to produce.

BRIEF DESCRIPTION OF THE DRAWINGS

One or more embodiments will now be described with reference to the annexed drawings, which are non-limiting, and in which.

DETAILED DESCRIPTION

Figure 1:
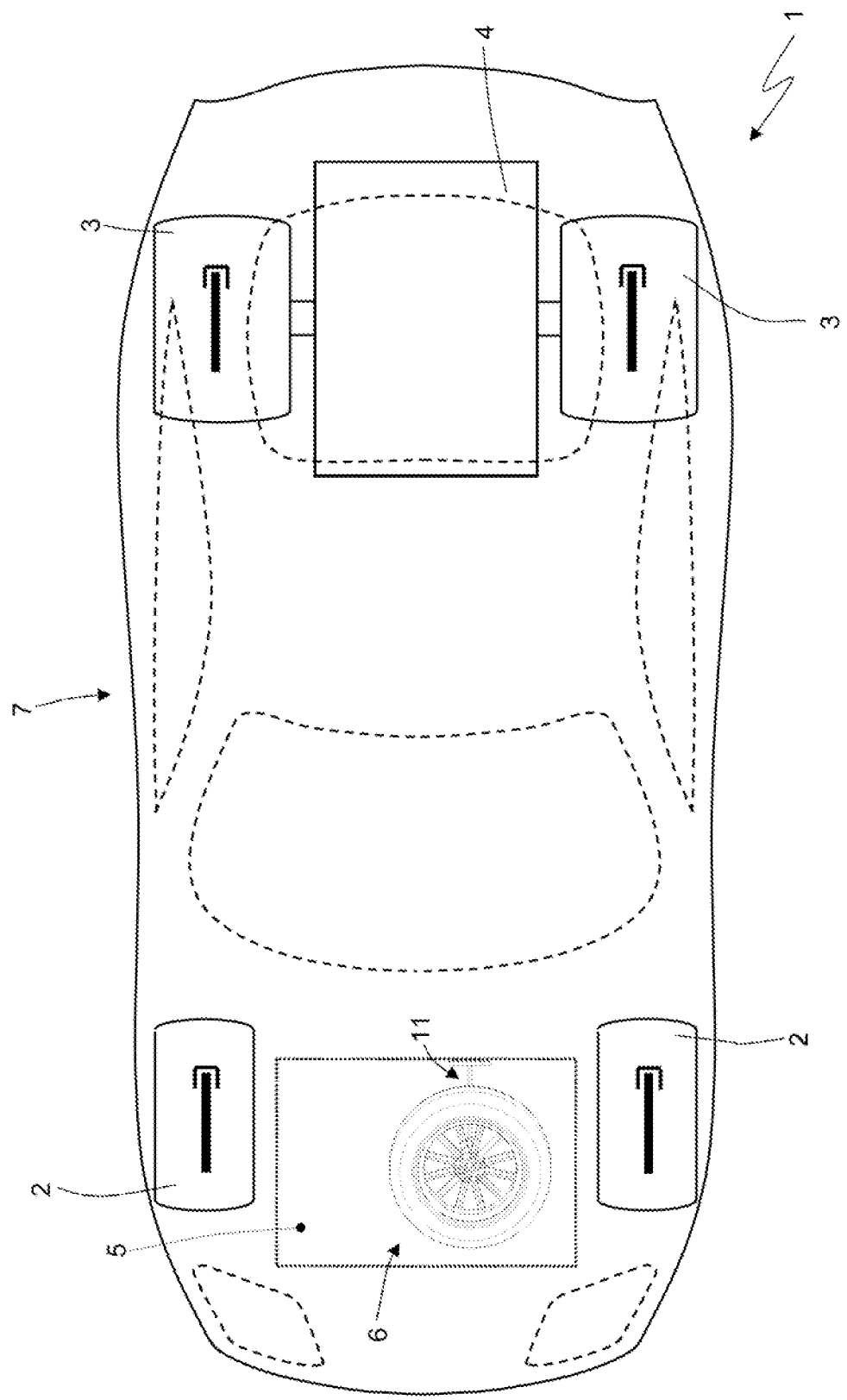
FIG. 1 is a schematic view of a vehicle provided in accordance with an embodiment.

In FIG. 1, designated as a whole by the reference number 1, is an embodiment of a road vehicle provided with two front wheels 2 and two rear drive wheels 3, which receive the motive torque from an internal-combustion engine 4 set at the back.

Defined within the vehicle 1 is a front boot compartment 5 set at the front, a passenger compartment in a central position, and a rear engine compartment, which is set at the back in order to house inside it the internal-combustion engine 4 and the transmission that transmits the motive torque from an engine shaft of the internal-combustion engine 4 to the rear drive wheels 3.

Figure 2:
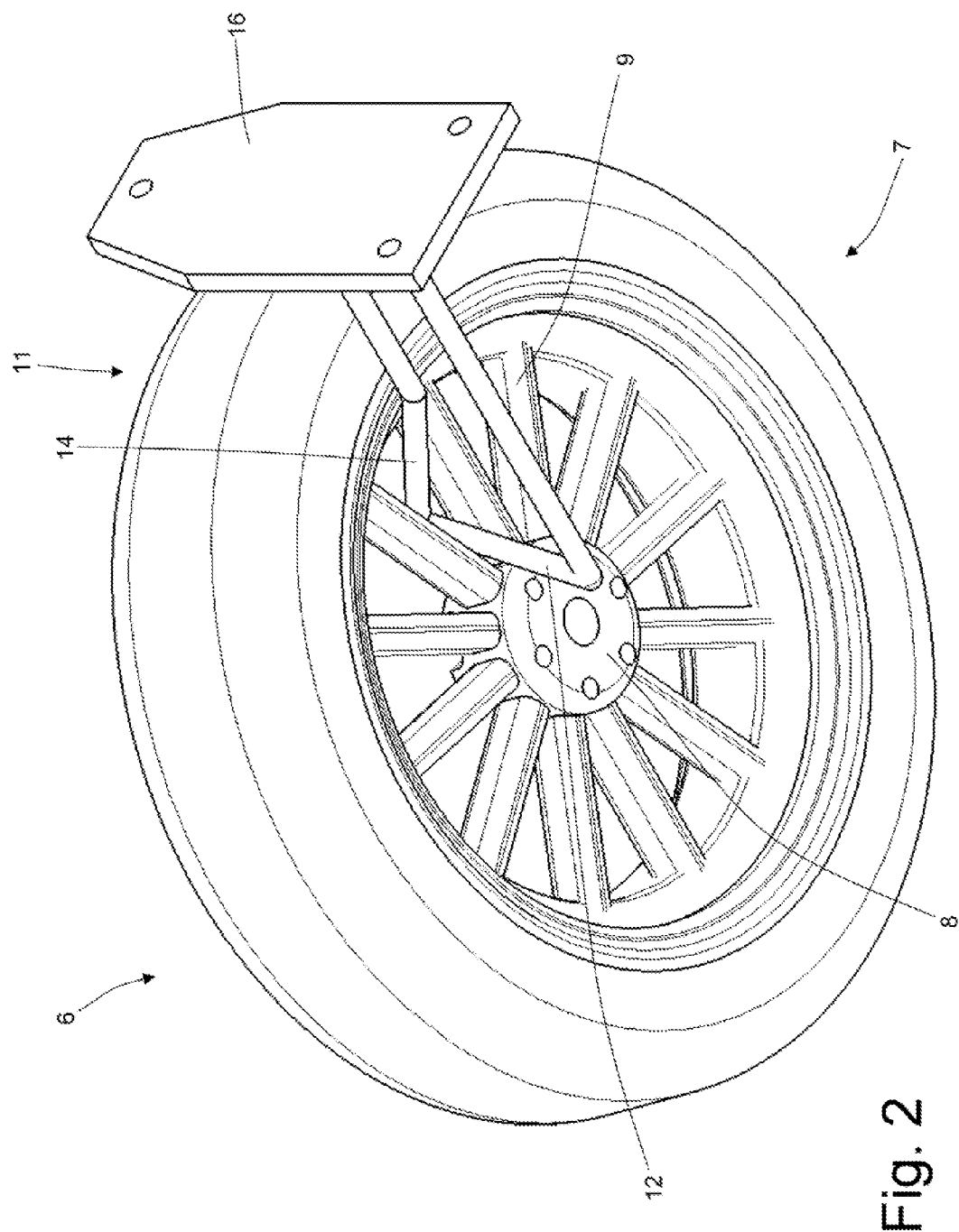
FIG. 2 is a perspective view of an embodiment of a spare wheel housed in the front boot compartment of the vehicle of FIG. 1.

Housed in the front boot compartment 5 is a spare wheel 6, which, as is illustrated more clearly in FIG. 2, comprises a rim 7 provided with a central hub 8, departing from which is a series of spokes 9, and a tire 10 mounted on the rim 7. In addition, set in the front boot compartment 5 is a passive thrust device 11 (i.e., one without moving parts), which rests against the spare wheel 6 and pushes the spare wheel 6 in an eccentric way in order to bring about a rotation of the spare wheel 6 about a horizontal axis of rotation and towards a vertical position following upon a progressive reduction of the size of the front boot compartment 5 during a front impact. In other words, in the event of front impact, the spare wheel 6 pushed towards the back of the vehicle 1 tends to turn into a vertical position exploiting the thrust device 11 as a ramp. According to what is illustrated in FIGS. 2-5, the thrust device 11 comprises an inclined plane 12, resting on which is a portion of the spare wheel 6, namely, the central hub 8 of the rim 7.

Figure 3:
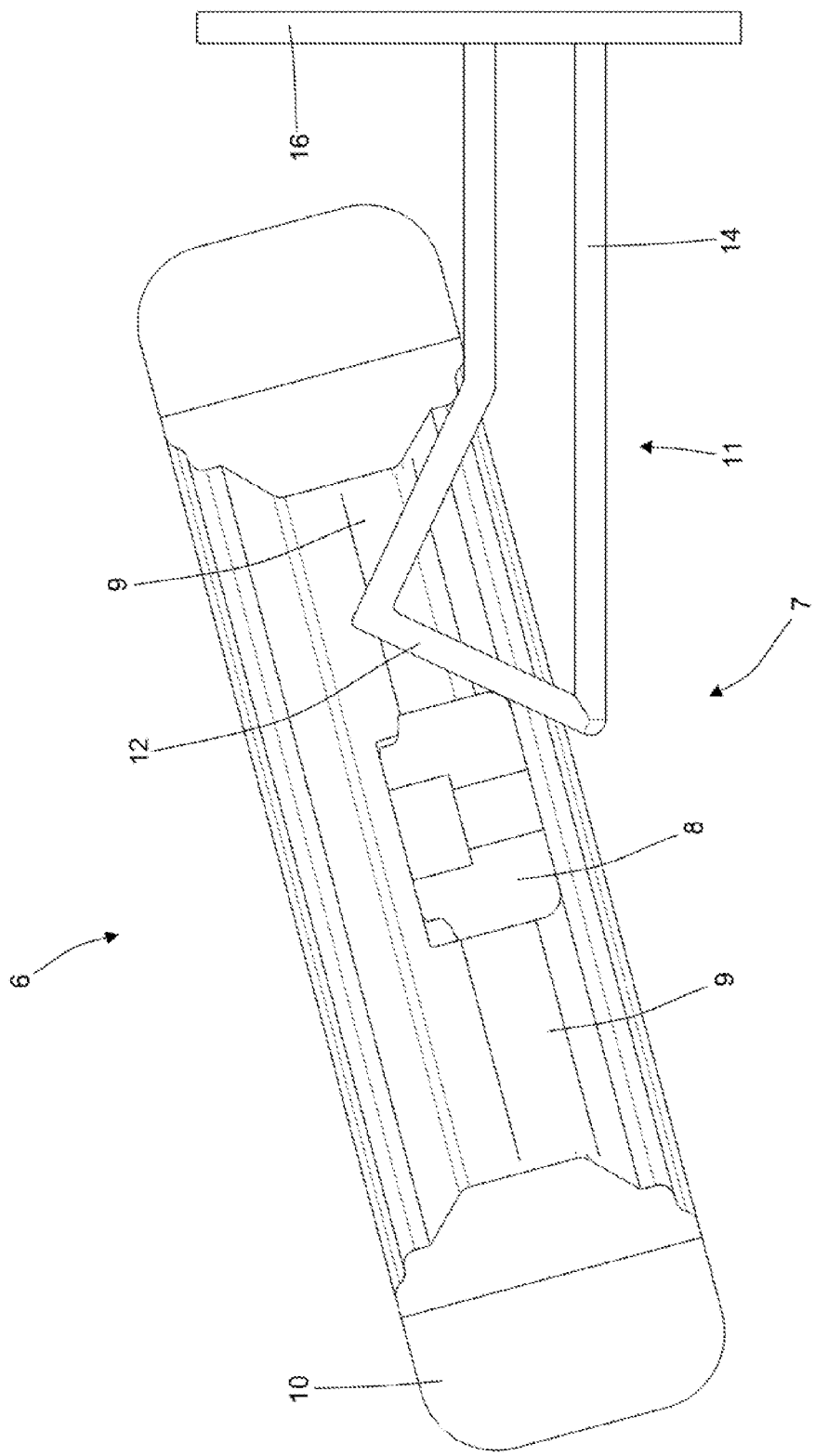
FIG. 3 is a cross-sectional view of the spare wheel of FIG. 2.
Figure 4:
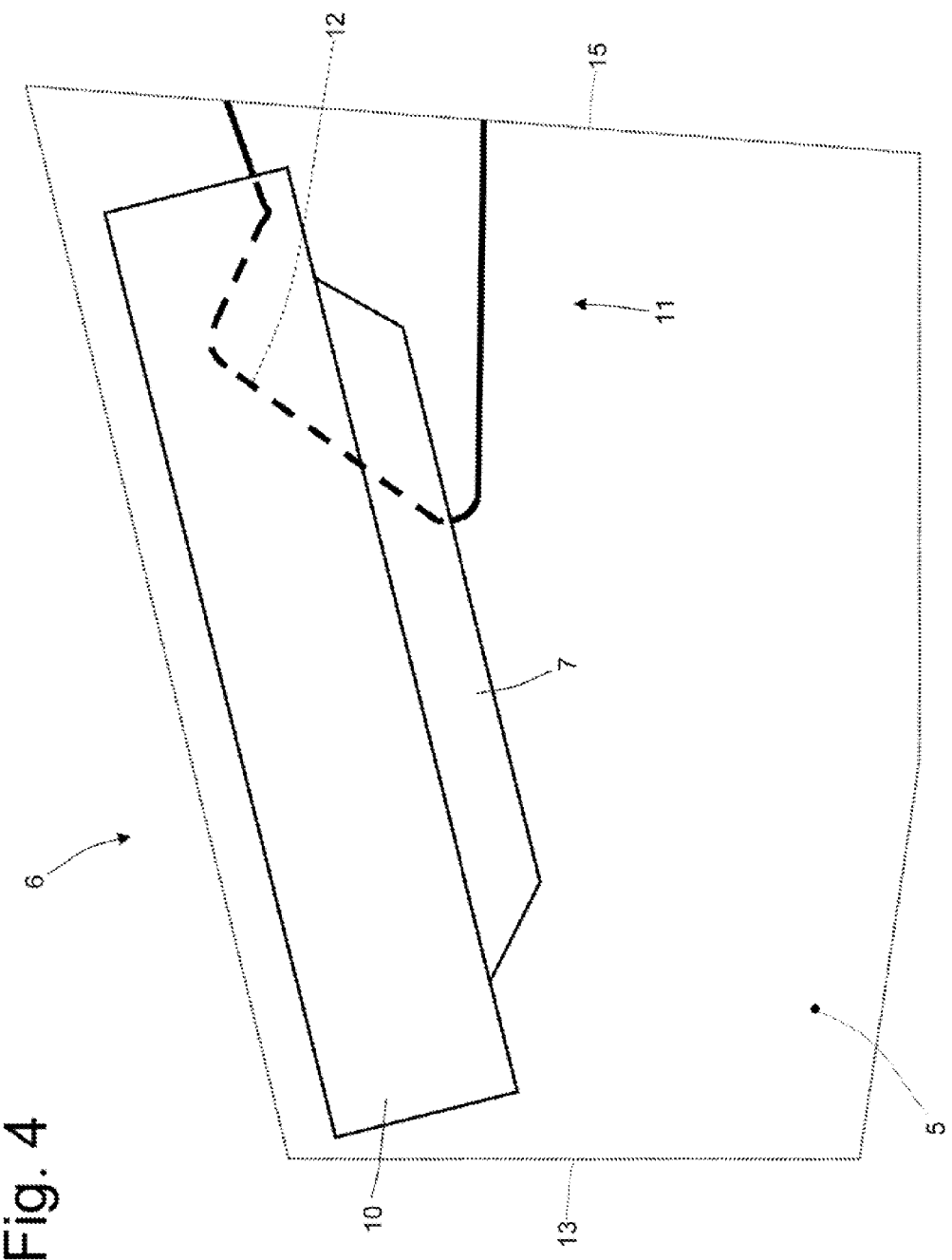
FIGS. 4 and 5 are schematic side views, with parts removed for reasons of clarity, of an embodiment of a front boot compartment of the vehicle of FIG. 1 in normal conditions and after a front impact, respectively.
Figure 5:
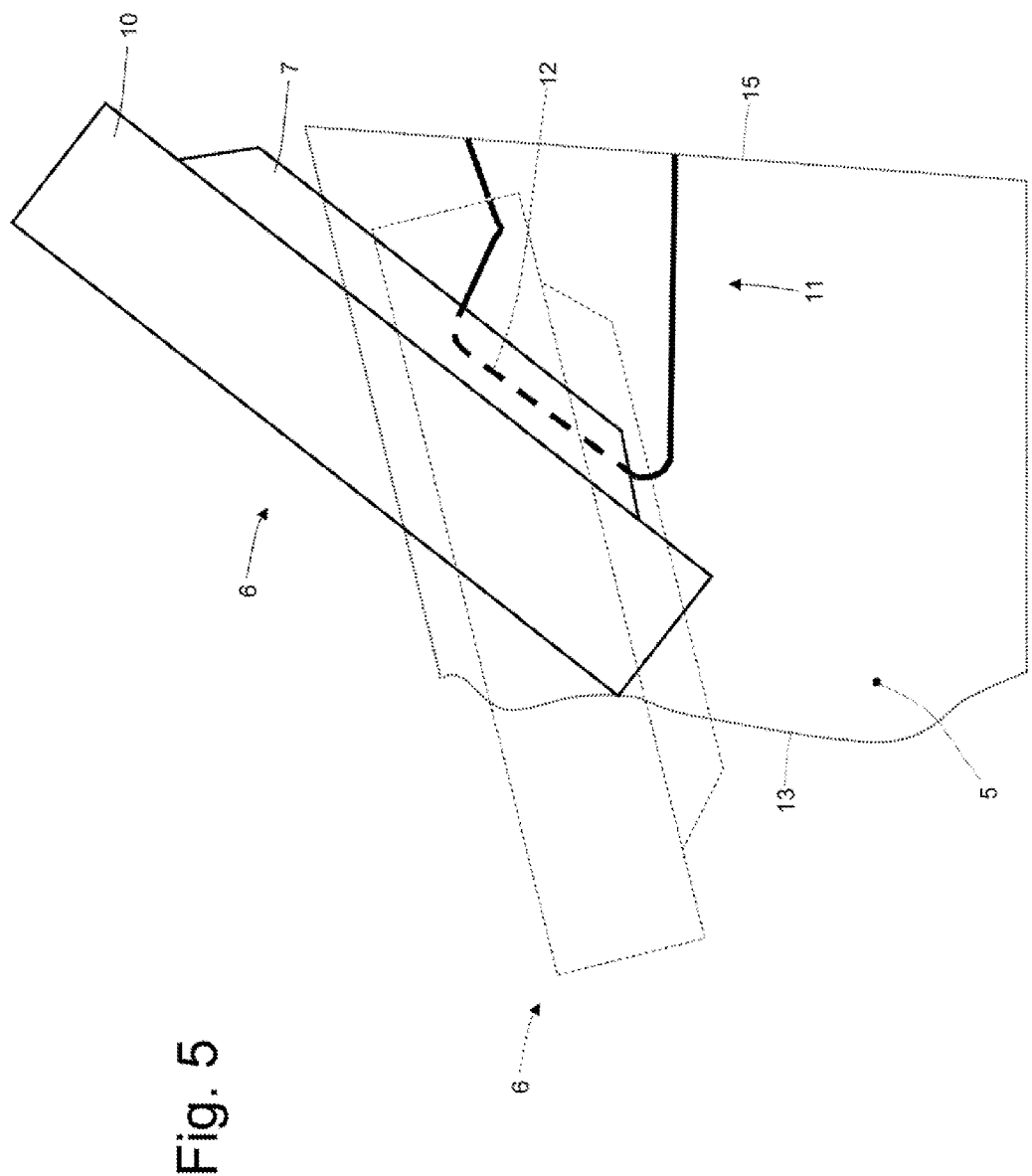

According what is illustrated in FIGS. 3-5, when the vehicle 1 is in normal conditions, the spare wheel 6 is set in a substantially horizontal position (i.e., with a small angle with respect to the horizontal plane of around 10°-20°) and the central hub 8 of the rim 7 rests against a bottom portion (base) of the inclined plane 12 of the thrust device 11 (i.e., the central hub 8 of the rim 7 between two spokes 9 rests against the bottom portion of the inclined plane 12 of the thrust device 11). Thanks to this arrangement of the spare wheel 6, it may be possible to optimize the aerodynamic performance by reducing both the coefficient of aerodynamic penetration and the area of the front section to a minimum (as a result of a reduction of the transverse and vertical encumbrance). Moreover, thanks to this arrangement of the spare wheel 6, it may also be possible to obtain a certain reduction of the weight of the vehicle 1.

According to what is illustrated in FIG. 5, in the event of front impact (or semi-frontal, i.e., partially front and partially lateral, impact) the front part of the vehicle 1 collapses in a controlled way as a result of the impact and through a controlled deformation of purposely provided structural elements of the vehicle frame that have the task of absorbing the energy of the impact by undergoing deformation. Controlled collapse of the front part of the vehicle 1 determines a progressive reduction of the length (i.e., of the longitudinal dimension) of the front boot compartment 5, and said reduction brings a front wall 13 of the front boot compartment 5 into contact with the spare wheel 6. Once the front wall 13 of the front boot compartment 5 has come into contact with the spare wheel 6, the further collapse of the front part of the vehicle 1 leads the front wall 13 to push the spare wheel 6 backwards (i.e., towards the rear of the vehicle 1). When the front wall 13 of the front boot compartment 5 pushes the spare wheel 6 backwards, the spare wheel 6 is forced to slide along the inclined plane 12 of the thrust device 11, and hence the spare wheel 6 is pushed upwards in an eccentric way by the thrust device 11, which determines a rotation of the spare wheel 6 about a horizontal axis of rotation and towards a subsequent vertical position. Said movement of rotation of the spare wheel 6 about a horizontal axis of rotation and towards a vertical position may be clearly seen in FIG. 5, which illustrates both the spare wheel 6 in the normal position (dashed line) and the spare wheel 6 in the raised position (solid line) following upon a front impact that has determined a controlled collapse of the front part of the vehicle 1.

Thanks to the presence of the thrust device 11, the spare wheel 6 housed in the front boot compartment 5 normally has a quasi horizontal orientation (represented with a solid line in FIG. 3 and with a dashed line in FIG. 5), which enables optimization of the aerodynamic performance, and at the same time, in the event of front impact that determines a controlled collapse of the front part of the vehicle 1, the spare wheel 6 housed in the front boot compartment 5 has an orientation that tends towards the vertical (represented with a solid line in FIG. 5) so as to reduce the longitudinal encumbrance and hence prevent controlled deformation of the vehicle frame from being in any way hindered.

Figure 6:
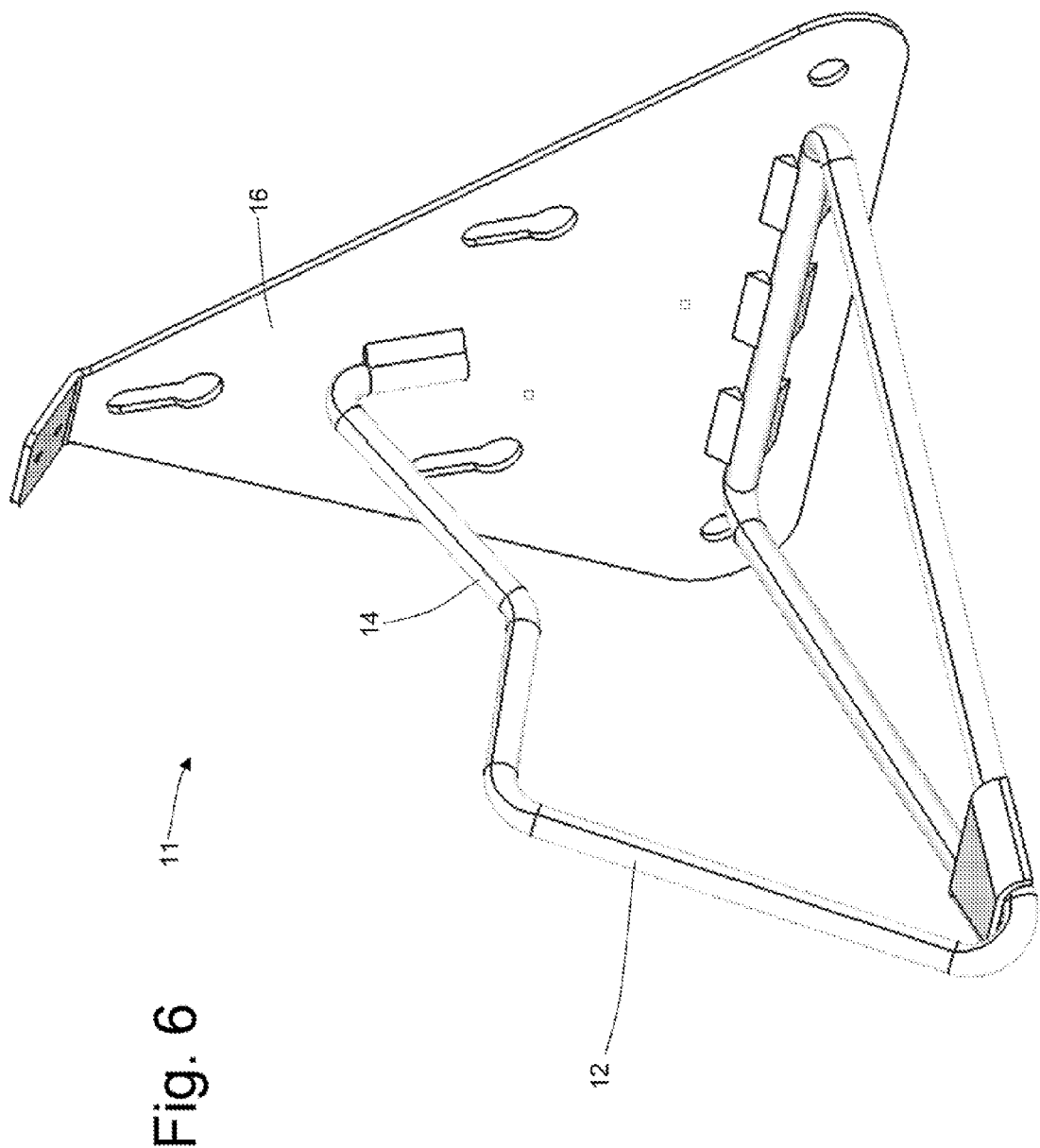
FIGS. 6-8 are two different perspective views and a side view, respectively, of an embodiment of a thrust device that is inserted within the front boot compartment of FIGS. 4 and 5 and is coupled to the spare wheel.
Figure 7:
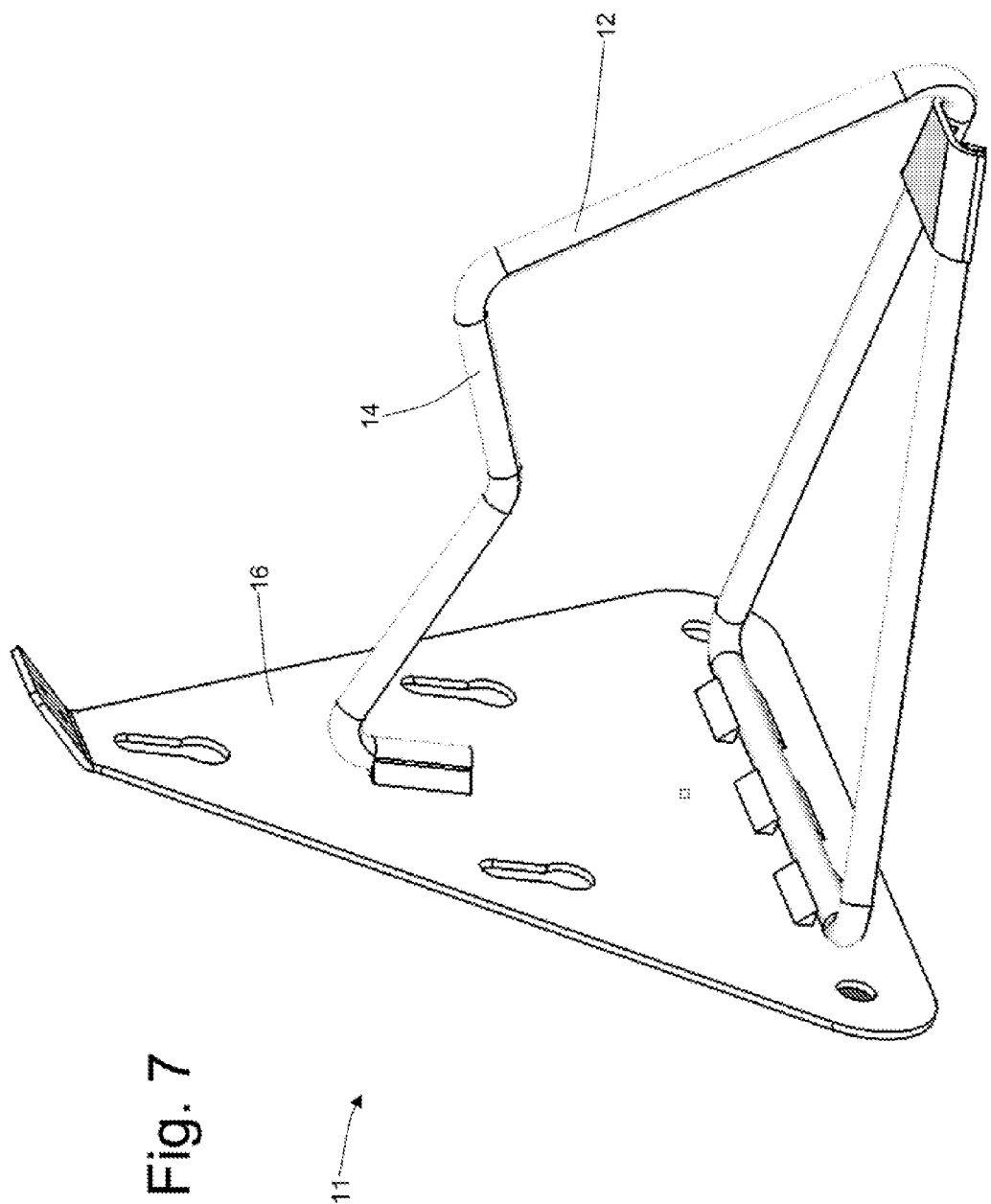
Figure 8:
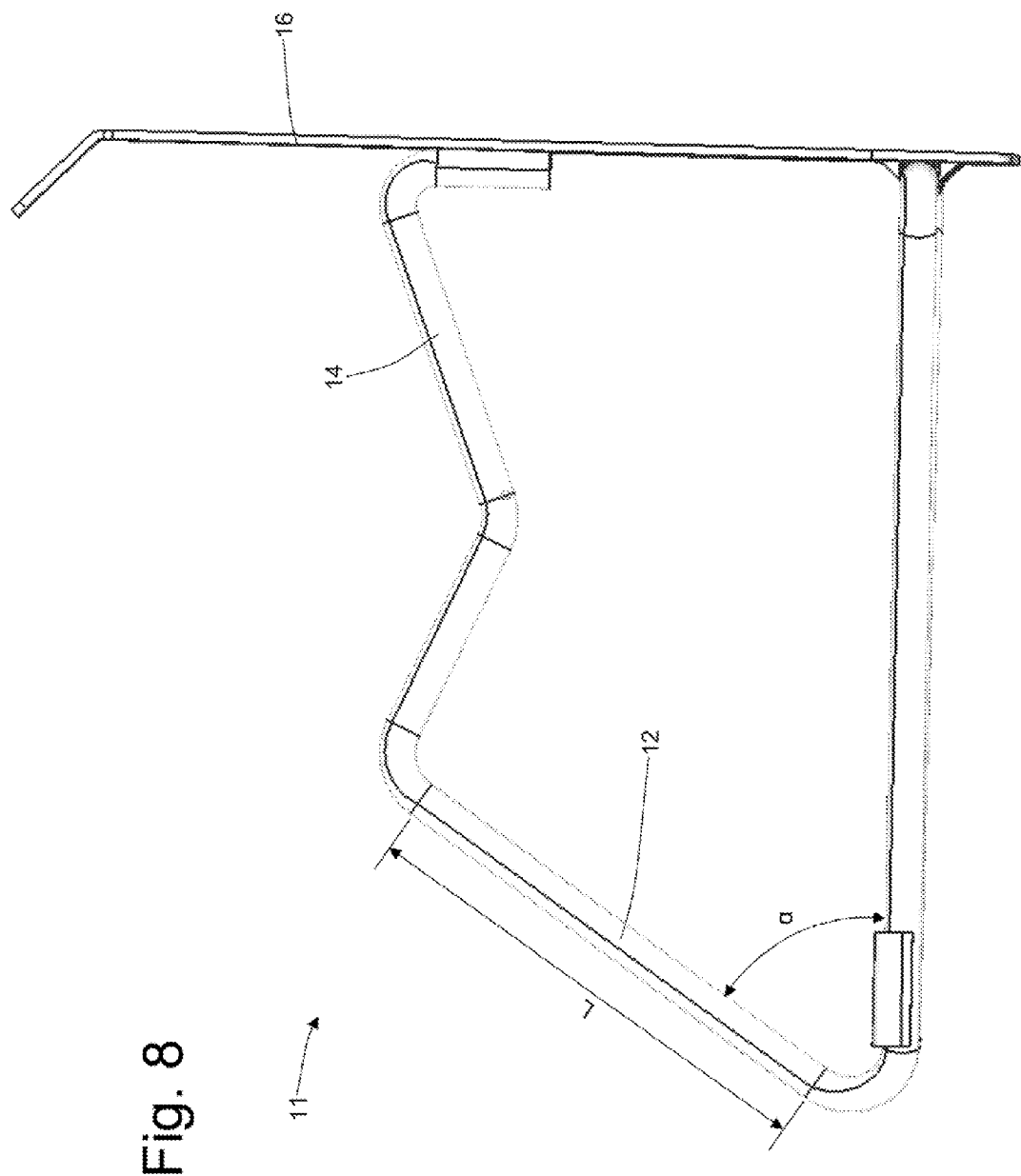

According to what is illustrated in FIGS. 6-8, the thrust device 11 comprises a bracket 14, which is constituted by a tubular element bent to form a U and rises in cantilever fashion from a rear wall 15 of the front boot compartment 5, and a fixing plate 16, which supports the bracket 14 and is fixed to the rear wall 15 of the front boot compartment 5. The bracket 14 comprises a front portion, which constitutes the inclined plane 12; the length L of the inclined plane 12 and the inclination a of the inclined plane 12 depend upon the initial position of the spare wheel 6 within the front boot compartment 5 and upon the desired position of the spare wheel 6 after the front impact.

In an embodiment illustrated in the attached figures, the vehicle 1 has the engine 4 at the back, and hence the spare wheel 6 is housed in the front boot compartment 5. According to an alternative embodiment (not illustrated), the vehicle 1 has the engine 4 at the front, and hence the spare wheel 6 is housed in a rear boot compartment; also in an embodiment, housed in the rear boot compartment is the thrust device 11, which enables the spare wheel 6 to be normally housed with a horizontal (or quasi horizontal) orientation in so far as it determines displacement of the spare wheel 6 towards a quasi vertical position in the event of rear impact that determines a controlled collapse of the rear part of the vehicle 1. It is noted that in the event of rear impact, the spare wheel 6 arranged in a horizontal or quasi horizontal position is dangerous not only for the obstacle that it represents in regard to controlled deformation of the rear portion of the vehicle 1, but also for the fact that it may impact against the fuel tank causing failure thereof and/or may enter the passenger compartment jeopardizing safety of the occupants of the vehicle 1.

An embodiment of the vehicle 1 described above presents numerous advantages thanks to the presence of the thrust device 11.

In the first place, the presence of the thrust device 11 enables the spare wheel 6 to be set in a best position to optimize the aerodynamic performance without any penalization for the safety of the occupants of the vehicle 1 in the event of impact that determines a controlled collapse of part of the vehicle 1.

In addition, the thrust device 11 is constituted by a relatively small metal body that has a low weight and a very low cost for production and installation in the front boot compartment 5.

It is noted that the thrust device 11 is completely passive; i.e., it does not envisage moving parts and/or systems to be activated. This characteristic on the one hand renders the thrust device 11 extremely advantageous from the economic point of view and without any need for periodic maintenance and on the other hand renders its intervention altogether certain (i.e., since the thrust device 11 is completely passive, it typically cannot undergo failure).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:
1. A vehicle, comprising:
a boot compartment;
a spare wheel, which is housed within the boot compartment; and
a thrust device, which is set within the boot compartment, having an inclined plane resting on which is a portion of the spare wheel, and coupled to push the spare wheel in an eccentric way in order to bring about a rotation of the spare wheel about a horizontal axis of rotation and towards a vertical position following upon a progressive reduction of a size of the boot compartment during impact;

wherein the thrust device includes a bracket, which is constituted by a tube bent to form a U, defines the inclined plane, and rises in cantilever fashion from a wall of the boot compartment;

wherein the spare wheel includes a rim and a tire mounted on the rim, the being provided with a central hub that rests on the inclined plane without being fixed to the inclined plane so that the central hub is free to slide along the inclined plane;

wherein the thrust device does not collapse during impact so that the spare wheel is pushed by a collapsing of the boot compartment to be forced to slide along the inclined plane of the thrust device.

2. The vehicle according to claim 1, wherein the thrust device includes a fixing plate, which supports the bracket and is fixed to the wall of the boot compartment.

3. An apparatus, comprising:

a compartment; and a thrust device, within the compartment, having an inclined plane on which rests a central hub of a rim of a spare wheel, the central hub being free to slide along the inclined plane;

wherein the thrust device includes a bracket having a tube bent to form a U that defines the inclined plane; and wherein the thrust device does not collapse during impact so that the spare wheel is pushed by a collapsing of the compartment to be forced to slide along the inclined plane of the thrust device.

4. The apparatus of claim 3, wherein the thrust device includes a fixing plate, which supports the bracket and is fixed to a wall of the compartment.

\* \* \* \* \*